United States Patent [19]

Burger et al.

[11] 4,162,206

[45] Jul. 24, 1979

[54] SEPARATION OF IODINE FROM MERCURY CONTAINING SCRUBBING SOLUTIONS

[75] Inventors: Leland L. Burger, Richland; Randall D. Scheele, Kennewick, both of Wash.

[73] Assignee: The United States of America as represented by the United States Department of Energy, Washington, D.C.

[21] Appl. No.: 961,174

[22] Filed: Nov. 16, 1978

[51] Int. Cl.$^2$ .................................................. C25B 1/24
[52] U.S. Cl. ........................................ 204/94; 204/95; 204/149; 204/152
[58] Field of Search ................... 204/94, 95, 149, 152

[56] References Cited

U.S. PATENT DOCUMENTS

| | | | |
|---|---|---|---|
| 1,843,127 | 2/1932 | Girvin | 204/94 X |
| 1,930,143 | 10/1933 | Hickman et al. | 204/94 |
| 3,907,592 | 9/1975 | Symons | 204/95 X |

Primary Examiner—Arthur C. Prescott
Attorney, Agent, or Firm—Dean E. Carlson; Frank H. Jackson; James W. Weinberger

[57] ABSTRACT

Radioactive iodines can be recovered from a nitric acid scrub solution containing mercuric nitrate by passing a current through the scrub solution to react the iodine with the mercuric nitrate to form mercuric iodate which precipitates out. The mercuric iodate can then be reacted to recover the radioiodine for further processing into a form suitable for long-term storage and to recover the mercury for recycling.

5 Claims, No Drawings

SEPARATION OF IODINE FROM MERCURY CONTAINING SCRUBBING SOLUTIONS

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to a method for the recovery of iodine from nitric acid scrub solutions containing mercuric nitrate.

Fission-product iodine-127, iodine-129 and iodine-131 are produced in the fuel pins of a light-water nuclear reactor. Over 99% of the iodine remains trapped until the irradiated fuel is processed. During fuel dissolution, up to 99% of the entrapped iodine can be volatilized in the process off-gas. What remains in solution may be evolved later from other processes, such as evaporation and calcination of liquid wastes. Because of the long half-life of iodine-129, the recovery of these radioiodines from the waste gas streams and their ultimate storage is important to prevent any detrimental effect upon the public.

A number of processes have been developed for the recovery of these radioactive iodines from dissolver gas streams. Caustic scrubbing has been used in several reprocessing plants, but has been found to be ineffective for the removal of organic iodides. In another process the gas is passed through a very strong nitric acid solution while in still another process the off-gas is directed through a bed of silver-exchanged zeolite on which the various iodine species are chemisorbed. One of the most effective methods for the removal of radioactive iodines from gas streams is the use of nitric acid scrubbing solutions containing mercury. The nitrate salt is commonly employed because of its availability, because the gas streams often contain NO and $NO_2$ and because nitric acid is useful in decomposing organic iodides to a recoverable form. The efficiency of the scrubber is due to the very strong complexes formed between mercury and iodine. However, this leads to the difficult problem of isolating the iodine for storage or disposal and separating the mercury for reuse. Even if not reused, disposal of mercury is to be avoided for environmental reasons.

This process is known as the Mercurex process and utilizes an 8 to 16.0 M nitric acid scrub solution containing about 0.2 to 0.4 M mercuric nitrate. At high acid concentrations the iodine in the solution can be converted from the mercuric iodide complex to the more stable (from the standpoint of iodine volatility) mercuric iodate by heating the solution to boiling before it is recycled back to the scrub column. As the acid concentrations decrease, the heating time increases and the amount of the iodine converted to the more stable form decreases rapidly. More importantly, heating the nitric acid scrub solution to the boiling temperature required for the conversion results in the volatilization of from 5 to 10% of the radioactive iodine present in the solution, requiring that the iodine must again be recovered from the gaseous state. This results in increased process costs. Alternatively, the waste scrub solutions can be mixed with concrete for long-term storage. This, however, represents a substantial volume of material for which expensive storage must be provided.

SUMMARY OF THE INVENTION

We have developed a process for the separation of iodine from nitric acid scrubbing solutions containing mercuric nitrate which eliminates the problems attendant with the prior art process. By the process of our invention, the nitric acid concentration of the scrub solution containing mercuric nitrate and iodine is adjusted to about 1.0 to 16.0 M to prepare a feed solution, and a current is passed through the solution at a density of from 0.1 to 1.0 amps/cm$^2$, to react the iodine present in the feed solution with the mercuric nitrate and form mercuric iodate which precipitates out and can then be recovered from the solution. The mercuric iodate can either be stored or it can be processed to separate the iodine for processing for storage and to recover the mercury for recycling. The nitric acid - mercuric nitrate solution may also be recycled after replacement of the lost mercuric nitrate.

This process has the advantage over prior art processes in that there is no volatilization of the radioactive iodine. Furthermore, the process adds no new ions to the system which might eventually require separation and increase disposal problems. Still another advantage of the process of the invention is that it may be used with scrub solutions of a variety of nitric acid concentrations with a minimum of preparation.

It is therefore the object of the invention to provide an improved method for the recovery of iodine from nitric acid scrub solutions containing mercuric nitrate.

DETAILED DESCRIPTION OF THE PREFERRED EMBODIMENT

These and other objects of the invention for recovering iodine from a nitric acid scrub solution containing mercuric nitrate may be met by adjusting the nitric acid concentration to from about 6.0 to 16.0 M to prepare a feed solution, passing a current at a density of 0.1 to 1.0 amps/cm$^2$ through the feed solution, whereby the iodine and the mercuric nitrate present in the feed solution react and form mercuric iodate which precipitates out of the solution, and recovering the mercuric iodate.

After the mercuric iodate precipitate is recovered or separated from the feed solution, it can be reacted with a caustic such as sodium hydroxide to form sodium iodate which is soluble in the solution and insoluble mercuric oxide. The sodium iodate can then be converted into a suitable solid form and incorporated into cement, polymer or glass for long-term storage of the radioactive iodines. The mercuric oxide can then be dissolved in nitric acid to form mercuric nitrate and recycled back into the scrub system. Alternatively, the mercuric iodate can be fixed for storage by incorporation into a suitable solid form such as cement, polymer or glass.

While the nitric acid concentration of the feed solution may vary from about 1.0 to 16.0 M, it is the determining factor for the current density so that any iodine volatilization will be prevented. Thus at low acid concentrations of from about 1 to 6 M, current density is limited to about 0.1 to 0.3 amp/cm$^2$, while at acid concentrations greater than about 6 M current densities from 0.1 to 1.0 amps/cm$^2$ are suitable without any iodine volatilization. Current efficiencies are greater at low current densities while conversion times improve with increased current densitities.

Electrolysis of the feed solution may take place in any type of electrolytic cell known to those skilled in the art. Experiments have been performed with cells involving no isolation of electrodes. However, because of the high insolubility of the mercuric iodate the reaction can be carried out either with or without electrode isolation although some improved results may be expected in cells containing a diffusion barrier. The electrodes may be of any suitable material capable of withstanding the feed solution, such as platinum, and may be of any suitable shape, such as rods or plates.

Process temperatures may vary from about 10° to 50° C. without having an apparent effect upon the process.

EXAMPLE I

A number of experiments were performed in an electrolysis cell having no ion diffusion barriers. Each experiment was performed with 100 ml of 0.4 M $Hg(NO_3)_2$, 0.1 M iodine traced with $^{131}I$, and employing various $HNO_3$ concentrations.

In the first experiment 60% of the iodine was precipitated as mercuric iodate from a 0.9 M $NO_3$ solution after 3 hours of electrolysis at a current density of 0.1 amp/cm$^2$ and a solution temperature of 10° C. The current efficiency at 60% conversion was 50%. No iodine was lost by volatilization.

In the second experiment 95% of the iodine was precipitated as mercuric iodate from a 6.0 M $HNO_3$ solution after 2.75 hours of electrolysis at a current density of 0.6 amp/cm$^2$ and a solution temperature of 30° C. The current efficiency at 60% conversion was 35%. No iodine was lost by volatilization.

In the third experiment 65% of the iodine was precipitated as mercuric iodate from an 11 M $HNO_3$ solution after 4.5 hours of electrolysis at a current density of 0.1 amp/cm$^2$ and a solution temperature of 50° C. The current efficiency at 60% conversion was 45%. No iodine was lost by volatilization.

EXAMPLE II

A number of other experiments were also run under conditions similar to those given in Example I. The results of the series of experiments are given in the table below.

| Anode Current Density, amp/cm$^2$ | HNO$_3$ Conc., M | Temperature, °C. | Current Efficiency[a] % |
|---|---|---|---|
| 0.10 | 0.92 | 10 | 46.9 |
| 0.10 | 0.85 | 10 | 48.4 |
| 1.0 | 0.85 | 10 | 0.0[b] |
| 1.0 | 0.85 | 10 | 0.0[b] |
| 0.10 | 10.71 | 10 | 44.1 |
| 0.10 | 10.71 | 10 | 39.5 |
| 1.0 | 11.02 | 10 | 27.9 |
| 1.0 | 10.71 | 10 | 30.8 |
| 0.1 | 0.92 | 50 | 52.6 |
| 0.1 | 0.85 | 50 | 44.1 |
| 1.0 | 0.85 | 50 | 0.0[b] |
| 1.0 | 0.85 | 50 | 0.0[b] |
| 0.1 | 11.02 | 50 | 42.9 |
| 0.1 | 10.71 | 50 | 40.5 |
| 1.0 | 11.02 | 50 | 26.1 |
| 1.0 | 11.02 | 50 | 24.0 |
| 1.0 | 11.02 | 50 | 29.3 |
| 0.6 | 6.24 | 30 | 33.5 |
| 0.6 | 6.24 | 30 | 39.0 |
| 0.6 | 6.24 | 30 | 37.7 |
| 0.6 | 6.24 | 30 | 40.0 |

[a] At 60% conversion.
[b] Iodine volatilized or precipitated as mercuric iodide.

As can be seen from the above discussion and examples, the process of this invention provides an efficient and effective method for the recovery of radioactive iodines from nitric acid scrub solutions containing mercuric nitrate so that the iodines can be further processed for safe long-term storage and so that the mercury can be effectively and safely recycled.

The embodiments of the invention in which an exclusive property or privilege is claimed are defined as follows:

1. A process for recovering iodine from a nitric acid scrub solution containing mercuric nitrate and iodine comprising:
   adjusting the nitric acid concentration from about 1 to 16.0 M to prepare a feed solution;
   passing a current through the feed solution at a current density of from about 0.1 to 1.0 amps/cm$^2$ to react the iodine with the mercuric nitrate and form mercuric iodate which precipitates out; and
   recovering the precipitated mercuric iodate.

2. The process of claim 1 wherein the feed solution is about 0.2 to 0.4 M in mercuric nitrate.

3. The process of claim 1 including the additional steps of:
   contacting the mercuric iodate with a solution of sodium hydroxide to form sodium iodate which dissolves in the solution and mercuric oxide which precipitates out; and
   recovering the mercuric oxide, thereby separating the iodine from the mercury compound.

4. The process of claim 3 wherein the nitric acid concentration is from about 1.0 to 6.0 M and the current density is from about 0.1 to 0.3 amp/cm$^2$.

5. The process of claim 3 wherein the nitric acid concentration is from about 6.0 to 16.0 M and the current density is from about 0.1 to 1.0 amp/cm$^2$.

* * * * *